US012793619B2

(12) United States Patent
Kim et al.

(10) Patent No.: US 12,793,619 B2
(45) Date of Patent: Nov. 10, 2026

(54) PIXEL, DISPLAY DEVICE INCLUDING THE SAME, AND ELECTRONIC DEVICE

(71) Applicant: Samsung Display Co., LTD., Yongin-si (KR)

(72) Inventors: Dong Woo Kim, Yongin-si (KR); Sang Jin Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/199,926

(22) Filed: May 6, 2025

(65) Prior Publication Data

US 2025/0391335 A1 Dec. 25, 2025

(30) Foreign Application Priority Data

Jun. 20, 2024 (KR) ........................ 10-2024-0080045
Oct. 21, 2024 (KR) ........................ 10-2024-0144112

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/043* (2013.01); *G09G 2300/0819* (2013.01); *G09G 2340/0457* (2013.01)

(58) Field of Classification Search
CPC ..................... G09G 2340/0457; G09G 3/3233
See application file for complete search history.

(56) References Cited

U.S. PATENT DOCUMENTS 12,046,185 B2 7/2024 Kim et al.
12,135,913 B2 11/2024 Kim et al.
2021/0210003 A1* 7/2021 Kim .................... G09G 3/2014
2023/0018546 A1* 1/2023 Kim ........................ G06F 3/147
2023/0207318 A1* 6/2023 Choi ..................... G09F 9/3026
430/311

(Continued)

FOREIGN PATENT DOCUMENTS

KR 10-2022-0052265 4/2022
KR 10-2023-0011844 1/2023
KR 10-2023-0023482 2/2023

OTHER PUBLICATIONS

Richter et al., "OLED-on-CMOS based bidirectional microdisplay for near-to-eye and sensor applications", IEEE, 2011 Semiconductor Conference Dresden, pp. 1-3.

*Primary Examiner* — Bipin Gyawali
(74) *Attorney, Agent, or Firm* — Womble Bond Dickinson (US) LLP

(57) ABSTRACT

A pixel includes a first transistor between third, second, and first nodes, a second transistor between fourth and second nodes and a first emission line, a third transistor between fourth node, a data line, and a scan line, a fourth transistor between a sixth power, third node, and a second emission line, a fifth transistor between third and fifth nodes and the second emission line, a sixth transistor between fifth and sixth nodes and second emission line, a seventh transistor between a pixel power, fifth node, and scan line, an eighth transistor between a first power, sixth node, and fifth node, a first capacitor between first and fourth nodes, a second capacitor between first power and fifth node, a third capacitor between fourth node and a seventh power, and a light emitting element between sixth node and a second power.

18 Claims, 14 Drawing Sheets

(56) References Cited

U.S. PATENT DOCUMENTS

| | | | | |
|---|---|---|---|---|
| 2023/0290287 | A1* | 9/2023 | Kim | G09G 3/006 |
| 2023/0351943 | A1* | 11/2023 | Xiao | G09G 3/32 |
| 2024/0038170 | A1* | 2/2024 | Zhai | G09G 3/3233 |
| 2025/0029550 | A1* | 1/2025 | Lin | G09G 3/32 |
| 2025/0104614 | A1* | 3/2025 | Kim | G09G 3/32 |

* cited by examiner

PXC: PAMU, PWMU

PXC: PAMU, PWMU

<CASE1>

<CASE1>

<P1>

PXC: PAMU, PWMU

<P2>

<P3>

PXC: PAMU, PWMU

<P_S1 (P4)>

PXC: PAMU, PWMU

<P_S2 (P4)>

PXC: PAMU, PWMU

<CASE2>

PIXEL, DISPLAY DEVICE INCLUDING THE SAME, AND ELECTRONIC DEVICE

CROSS-REFERENCE TO RELATED APPLICATION(S)

This application claims priority to and benefits of Korean Patent Application No. 10-2024-0080045, filed on Jun. 20, 2024, and No. 10-2024-0144112, filed on Oct. 21, 2024, under 35 U.S.C. § 119, the entire contents of which are incorporated herein by reference.

BACKGROUND

1. Technical Field

An embodiment of the disclosure relates to a pixel, a display device including the same, and an electronic device.

2. Description of the Related Art

As information technology develops, the importance of a display device which is a connection medium between a user and information is highlighted. In response to this, the use of the display device such as a liquid crystal display device and an organic light emitting display device is increasing.

Recently, a display device in which a high-resolution panel is applied is being applied to various fields, and thus a pixel applicable to the high-resolution panel is being demanded.

SUMMARY

An object to be solved by the disclosure is to provide a pixel applicable to a high-resolution panel, and a display device including the same.

Objects of the disclosure are not limited to the object described above, and other technical objects which are not described may be clearly understood by those skilled in the art from the description below.

According to embodiments of the disclosure, a pixel may include a first transistor having a first electrode connected to a third node, a second electrode connected to a second node, and a gate electrode connected to a first node, a second transistor having a first electrode connected to a fourth node, a second electrode connected to the second node, and a gate electrode connected to a first emission control line, a third transistor having a first electrode connected to the fourth node, a second electrode connected to a data line, and a gate electrode connected to a scan line, a fourth transistor having a first electrode connected to a sixth power line, a second electrode connected to the third node, and a gate electrode connected to a second emission control line, a fifth transistor having a first electrode connected to the third node, a second electrode connected to a fifth node, and a gate electrode connected to the second emission control line, a sixth transistor having a first electrode connected to the fifth node, a second electrode connected to a sixth node, and a gate electrode connected to the second emission control line, a seventh transistor having a first electrode connected to a pixel power line, a second electrode connected to the fifth node, and a gate electrode connected to the scan line, an eighth transistor having a first electrode connected to a first power line, a second electrode connected to the sixth node, and a gate electrode connected to the fifth node, a first capacitor connected between the first node and the fourth node, a second capacitor connected between the first power line and the fifth node, a third capacitor connected between the fourth node and a seventh power line, and a light emitting element connected between the sixth node and a second power line.

Each of the first to fourth transistors, the sixth transistor, and the seventh transistor may include an oxide semiconductor layer, and each of the fifth transistor and the eighth transistor may include a silicon semiconductor layer.

The pixel may further include a ninth transistor having a first electrode connected to the fifth node, a second electrode connected to a third power line, and a gate electrode connected to an initialization line.

The pixel may further include a tenth transistor having a first electrode connected to a first electrode of the light emitting element, a second electrode connected to a fourth power line, and a gate electrode connected to a control line.

The pixel may further include an eleventh transistor having a first electrode connected to a fifth power line, a second electrode connected to the first node, and a gate electrode connected to the initialization line.

The pixel may further include a twelfth transistor having a first electrode connected to the second node, a second electrode connected to a sweep line, and a gate electrode connected to the second emission control line.

The pixel may further include a thirteenth transistor having a first electrode connected to the sixth node, a second electrode connected to the first electrode of the light emitting element, and a gate electrode connected to the second emission control line.

According to embodiments of the disclosure, a display device may include a pixel disposed on a substrate. The pixel may include a first transistor having a first electrode connected to a third node, a second electrode connected to a second node, and a gate electrode connected to a first node, a second transistor having a first electrode connected to a fourth node, a second electrode connected to the second node, and a gate electrode connected to a first emission control line, a third transistor having a first electrode connected to the fourth node, a second electrode connected to a data line, and a gate electrode connected to a scan line, a fourth transistor having a first electrode connected to a sixth power line, a second electrode connected to the third node, and a gate electrode connected to a second emission control line, a fifth transistor having a first electrode connected to the third node, a second electrode connected to a fifth node, and a gate electrode connected to the second emission control line, a sixth transistor having a first electrode connected to the fifth node, a second electrode connected to a sixth node, and a gate electrode connected to the second emission control line, a seventh transistor having a first electrode connected to a pixel power line, a second electrode connected to the fifth node, and a gate electrode connected to the scan line, an eighth transistor having a first electrode connected to a first power line, a second electrode connected to the sixth node, and a gate electrode connected to the fifth node, a first capacitor connected between the first node and the fourth node, a second capacitor connected between the first power line and the fifth node, a third capacitor connected between the fourth node and a seventh power line, and a light emitting element connected between the sixth node and a second power line.

Each of the first to fourth transistors, the sixth transistor, and the seventh transistor may include an oxide semiconductor layer, and each of the fifth transistor and the eighth transistor may include a silicon semiconductor layer.

The pixel may further include a ninth transistor having a first electrode connected to the fifth node, a second electrode connected to a third power line, and a gate electrode connected to an initialization line.

The pixel may further include a tenth transistor having a first electrode connected to a first electrode of the light emitting element, a second electrode connected to a fourth power line, and a gate electrode connected to a control line.

The pixel may further include an eleventh transistor having a first electrode connected to a fifth power line, a second electrode connected to the first node, and a gate electrode connected to the initialization line.

The pixel may further include a twelfth transistor having a first electrode connected to the second node, a second electrode connected to a sweep line, and a gate electrode connected to the second emission control line.

The pixel may further include a thirteenth transistor having a first electrode connected to the sixth node, a second electrode connected to the first electrode of the light emitting element, and a gate electrode connected to the second emission control line.

The display device may further include a data driver connected to the data line, a scan driver connected to the scan line, a sweep driver connected to the sweep line, and a common driver connected to the initialization line, the first emission control line, the second emission control line, the control line, and the pixel power line.

In a first period of a driving frame period, the common driver may supply an initialization signal.

In a second period of the driving frame period, the scan driver may supply a scan signal to the scan line, and the data driver may supply a data signal to the data line.

In a third period of the driving frame period, the common driver may supply the scan signal to the scan line, and change pixel power supplied to the pixel power line from a first voltage level to a second voltage level.

In a fourth period of the driving frame period, the common driver may change a control signal supplied to the control line from a first level to a second level, and sequentially supply an emission control signal of a first level to the first emission control line and the second emission control line.

As a refresh rate decreases, the number of times the fourth period is discontinuously repeated in the driving frame period may increase.

According to embodiments of the disclosure, an electronic device may include a processor that provides image data, and a display device that displays an image based on the image data. The display device may include a pixel. The pixel may include a first transistor having a first electrode connected to a third node, a second electrode connected to a second node, and a gate electrode connected to a first node, a second transistor having a first electrode connected to a fourth node, a second electrode connected to the second node, and a gate electrode connected to a first emission control line, a third transistor having a first electrode connected to the fourth node, a second electrode connected to a data line, and a gate electrode connected to a scan line, a fourth transistor having a first electrode connected to a sixth power line, a second electrode connected to the third node, and a gate electrode connected to a second emission control line, a fifth transistor having a first electrode connected to the third node, a second electrode connected to a fifth node, and a gate electrode connected to the second emission control line, a sixth transistor having a first electrode connected to the fifth node, a second electrode connected to a sixth node, and a gate electrode connected to the second emission control line, a seventh transistor having a first electrode connected to a pixel power line, a second electrode connected to the fifth node, and a gate electrode connected to the scan line, an eighth transistor having a first electrode connected to a first power line, a second electrode connected to the sixth node, and a gate electrode connected to the fifth node, a first capacitor connected between the first node and the fourth node, a second capacitor connected between the first power line and the fifth node, a third capacitor connected between the fourth node and a seventh power line, and a light emitting element connected between the sixth node and a second power line.

Specific details of other embodiments are included in the detailed description and drawings.

The pixel, the display device, and the electronic device according to embodiments of the disclosure may implement a grayscale using a light emitting time. A light emitting element may be driven using a constant current (for example, a driving current) in case that the grayscale is implemented using the light emitting time, and thus display quality may be improved.

An effect according to embodiments is not limited to the contents exemplified above, and more various effects are included in the specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
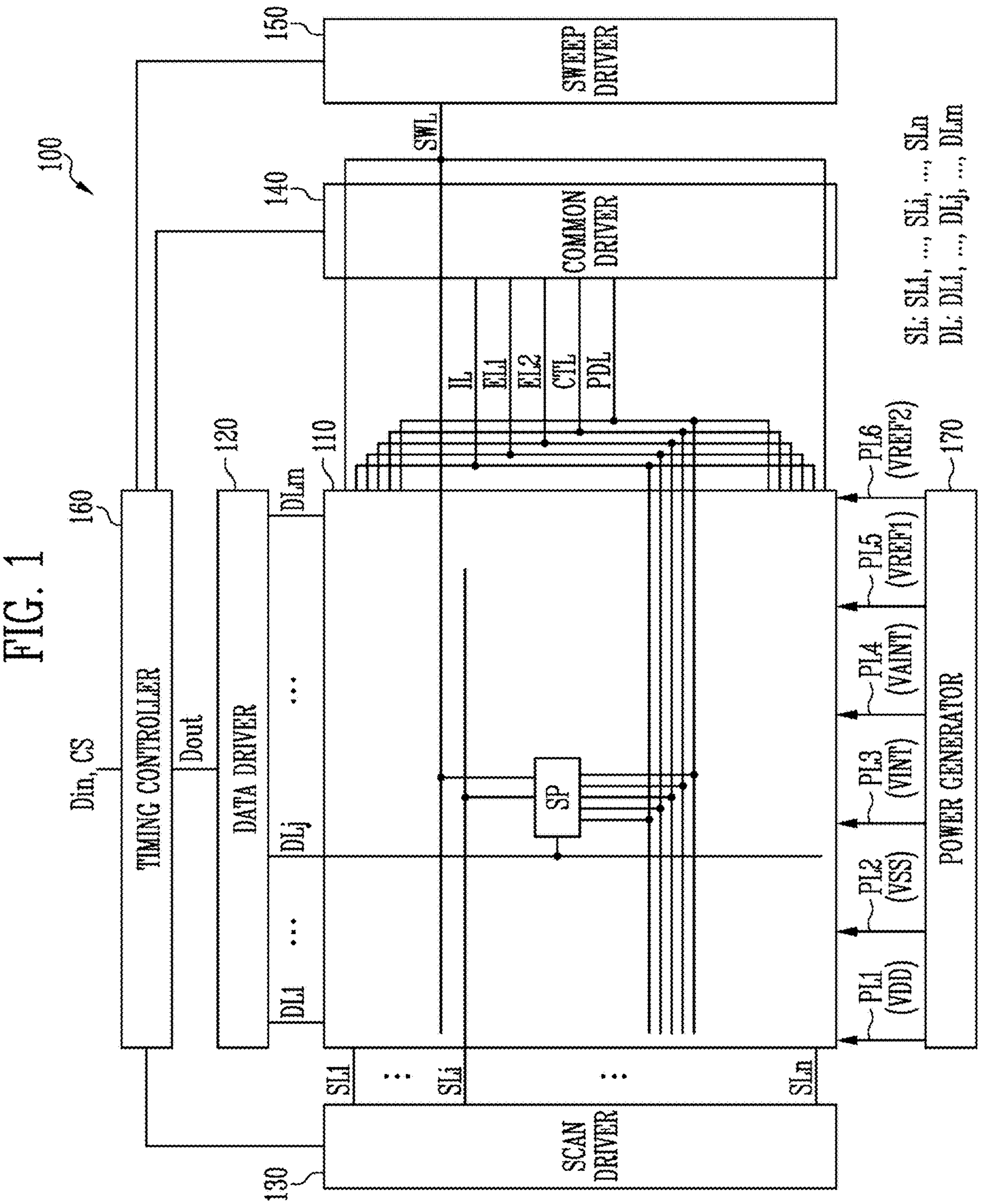
FIG. 1 is a drawing illustrating a display device according to embodiments.

Hereinafter, various embodiments of the disclosure will be described in detail with reference to the accompanying drawings so that those skilled in the art may readily carry out the disclosure. The disclosure may be implemented in various different forms and is not limited to the embodiments described herein.

To clearly describe the disclosure, parts that are not related to the description are omitted, and the same or similar elements are denoted by the same reference numerals throughout the specification. Therefore, the reference numerals may be used in other drawings.

In addition, an expression "is the same" in the description may mean "is substantially the same". That is, the expression "is the same" may be the same enough for those of ordinary skill to understand that it is the same. Other expressions may also be expressions in which "substantially" is omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the disclosure. In addition, in some embodiments, the block, unit and/or module may be physically combined into more complex blocks, units, and/or modules without departing from the scope of the disclosure.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

In the specification and the claims, the phrase "at least one of" is intended to include the meaning of "at least one selected from the group of" for the purpose of its meaning and interpretation. For example, "at least one of A and B" may be understood to mean "A, B, or A and B." In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

For example, the disclosure is not limited to the embodiments disclosed below, and may be modified in various forms and may be implemented. In addition, each of the embodiments disclosed below may be implemented alone or in combination with at least one of other embodiments.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a drawing illustrating a display device according to embodiments.

Referring to FIG. 1, the display device 100 may include a display unit 110 (or a display panel), a data driver 120, a scan driver 130, a common driver 140, a sweep driver 150, a timing controller 160, and a power generator 170.

Each of the data driver 120, the scan driver 130, the common driver 140, the sweep driver 150, the timing controller 160, and the power generator 170 may be configured as one integrated chip (IC), or two or more drivers (at least two of 120, 130, 140, 150, 160, and 170) may be configured as one IC. In an embodiment, a portion of the drivers 120, 130, 140, 150, 160, and 170 may not be configured as a chip, and may be formed in the display unit 110 similar to a sub-pixel SP (or a pixel). For example, at least one of the scan driver 130, the common driver 140, or the sweep driver 150 may be formed in the display unit 110.

The display unit 110 may include sub-pixels SP. Each of the sub-pixels SP may be connected to one of scan lines SL1, . . . , SLi, . . . , and SLn, one of data lines DL1, . . . , DLj, . . . , and DLm, an initialization line IL, a first emission control line EL1, a second emission control line EL2, a control line CTL, and a pixel power line PDL. Each of n and m may be a natural number greater than or equal to 3. Each of the sub-pixels SP may be connected to a first power line PL1, a second power line PL2, a third power line PL3, a fourth power line PL4, a fifth power line PL5, and a sixth power line PL6. Hereinafter, an expression "connected" may mean an electrical connection.

For example, a sub-pixel SP positioned on an i-th horizontal line (for example, sub-pixels SP connected to a same scan line may be classified as one horizontal line) and a j-th vertical line (for example, sub-pixels SP connected to a same data line may be classified as one vertical line) may be connected to an i-th scan line SLi, a j-th data line DLj, the initialization line IL, the first emission control line EL1, the second emission control line EL2, the control line CTL, and the pixel power line PDL. The initialization line IL, the first emission control line EL1, the second emission control line EL2, and the control line CTL may be commonly connected to the sub-pixels SP. The pixel power line PDL may be commonly connected to the sub-pixels SP emitting light in a same color. For example, sub-pixels SP emitting light in a first color (for example, red) may be commonly connected to a pixel power line PDL (or a first pixel power line), sub-pixels SP emitting light in a second color (for example, green) may be commonly connected to a pixel power line PDL (or a second pixel power line), and sub-pixels SP emitting light in a third color (for example, blue) may be commonly connected to a pixel power line PDL (or a pixel power line). Since operation voltages of the sub-pixels SP emitting light of different colors are different, the sub-pixels SP emitting light of different colors may be connected to different pixel power lines PDL. However, the disclosure is not limited thereto, and in another embodiment, the sub-pixels SP emitting light of different colors may be connected to a same pixel power line PDL.

Each of the sub-pixels SP may be selected in case that a scan signal is supplied to a scan line SL to which oneself is connected, and may receive a data signal from the data line DL to which oneself is connected. The sub-pixels SP that have received the data signal may emit light of a luminance during a light emitting time corresponding to the data signal.

Figure 4A:
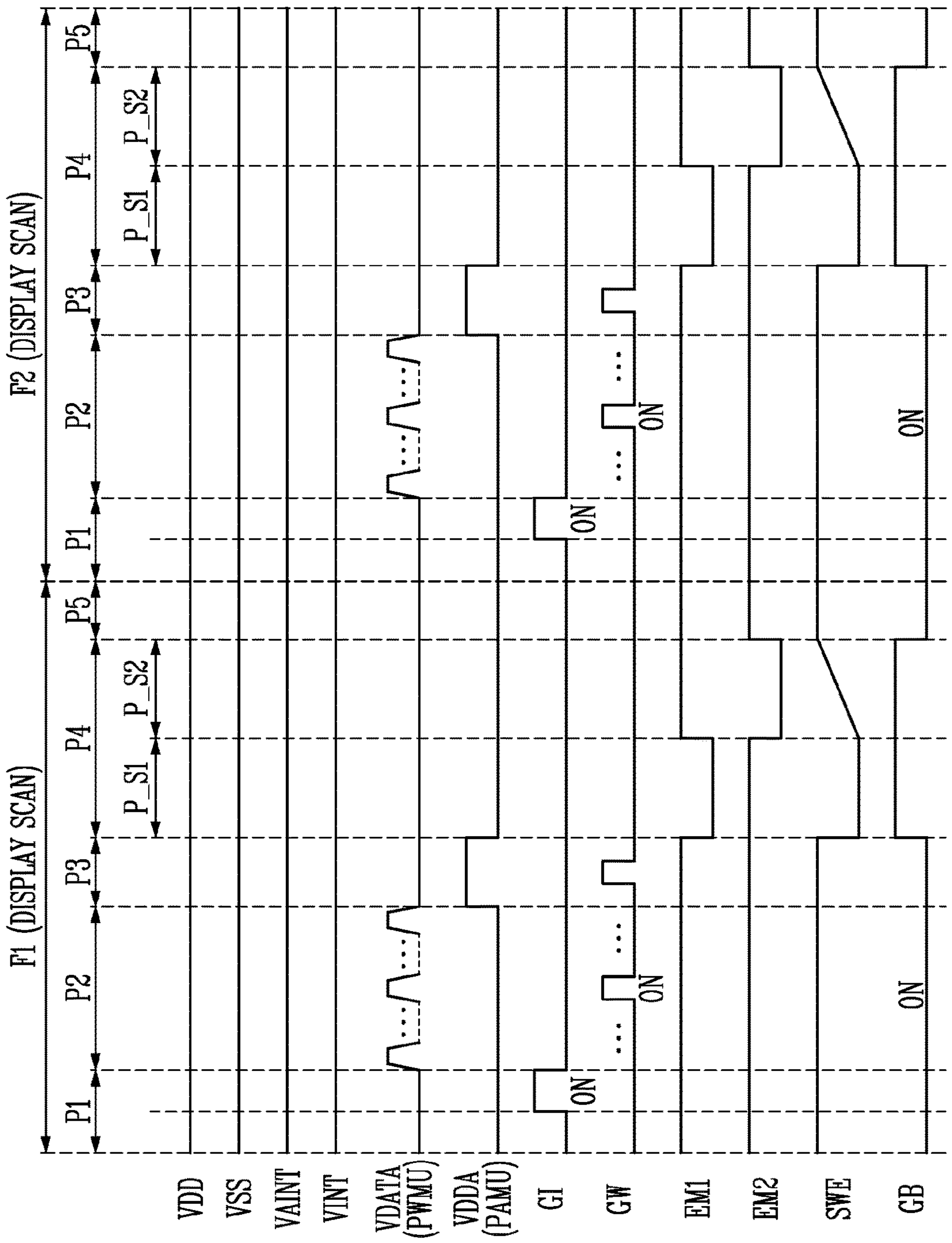
FIG. 4A is a waveform illustrating an embodiment of the operation of the display device shown in FIG. 1.

The data driver 120 may generate a data signal having a voltage using output data Dout, and supply the data signal to the data lines DL. For example, as shown in FIG. 4A, the data driver 120 may supply the data signal to the data lines DL during a second period P2 during one frame period. A voltage of the data signal may be set correspondingly to a grayscale of the output data Dout. The sub-pixels SP may emit light during a time corresponding to the voltage of the data signal.

The scan driver 130 may supply the scan signal to the scan lines SL formed for each horizontal line. For example, as shown in FIG. 4A, the scan driver 130 may sequentially supply a scan signal GW of a gate on voltage (or an enable scan signal) to the scan lines SL during the second period P2. The sub-pixels SP may be supplied with the data signal while being sequentially selected in a horizontal line unit.

A transistor supplied with the scan signal GW having the gate on voltage may be turned on. For example, the scan signal GW may have a logic high voltage in case that the transistor is an N-type transistor.

During a period in which the scan signal GW of the gate on voltage is not supplied to the scan lines SL, the scan lines SL may be supplied with a scan signal GW of a gate off voltage (or a disable scan signal). For example, the scan signal GW of the gate off voltage may have a logic low voltage, and thus a transistor supplied with the scan signal GW of the gate off voltage may be turned off.

The common driver 140 may supply an initialization signal to the initialization line IL, a first emission control signal to the first emission control line EL1, a second emission control signal to the second emission control line EL2, and a control signal to the control line CTL.

In an embodiment, as shown in FIG. 4A, the common driver 140 may supply an initialization signal of a gate on voltage (or an enable initialization signal) to the initialization line IL during a first period P1.

In an embodiment, as shown in FIG. 4A, the common driver 140 may supply a first emission control signal EM1 of a logic low level (or a gate on voltage) to the first emission control line EL1 in a first sub-period P_S1 of a fourth period P4. The common driver 140 may supply a second emission control signal EM2 of a logic low level (or a gate on voltage) to the second emission control line EL2 in a second sub-period P_S2 of the fourth period P4.

In an embodiment, the common driver 140 may supply a control signal GB of a gate on voltage to the control line CTL during the first period P1, the second period P2, a third period P3, and a fifth period P5. For example, the control signal GB of the gate on voltage may have a logic low voltage.

In an embodiment, as shown in FIG. 4A, the common driver 140 may supply pixel power VDDA (or a pixel voltage) of a second voltage level to the pixel power line PDL during the third period P3, and supply pixel power VDDA of a first voltage level to the pixel power line PDL during the first period P1, the second period P2, the fourth period P4, and the fifth period P5. The second voltage level may be higher than the first voltage level. The pixel power VDDA supplied to the pixel power line PDL may swing to have the first voltage level and the second voltage level, and thus may be supplied in a pulse form from the common driver 140.

For example, signal lines IL, EL1, EL2, CTL, and PDL that receive signals from the common driver 140 may be commonly connected to the sub-pixels SP. At least a portion of the common driver 140 may be included in the timing controller 160. For example, the common driver 140 may be replaced with the timing controller 160.

The sweep driver 150 may supply a sweep signal to a sweep line SWL. As shown in FIG. 4, the sweep signal may gradually increase from a third voltage level to a fourth voltage level during the fourth period P4.

The timing controller 160 may receive input data Din and a control signal CS from a processor. The processor may be an application processor, a central processing unit (CPU), a graphics processing unit GPU, or the like.

The timing controller 160 may generate the output data Dout by correcting the input data Din. For example, the timing controller 160 may generate the output data Dout by correcting the input data Din correspondingly to a temperature, an optical measurement result (measurement in a process), a dimming level, and the like of the display unit 110. The timing controller 160 may generate driving signals for controlling the drivers 120, 130, 140, 150, and 170 correspondingly to the control signal CS, and supply the driving signals to the respective drivers 120, 130, 140, 150, 160, and 170.

The power generator 170 may supply a voltage to the display unit 110. For example, the power generator 170 may supply first power VDD to the first power line PL1, second power VSS to the second power line PL2, initialization power VINT (or first initialization power) to the third power line PL3, second initialization power VAINT to the fourth power line PL4, first reference power VREF1 to the fifth power line PL5, and the second reference power VREF2 to the sixth power line PL6. The first power line PL1, the second power line PL2, the third power line PL3, the fourth power line PL4, the fifth power line PL5, and the sixth power line PL6 may be commonly connected to the sub-pixels SP.

Figure 2A:
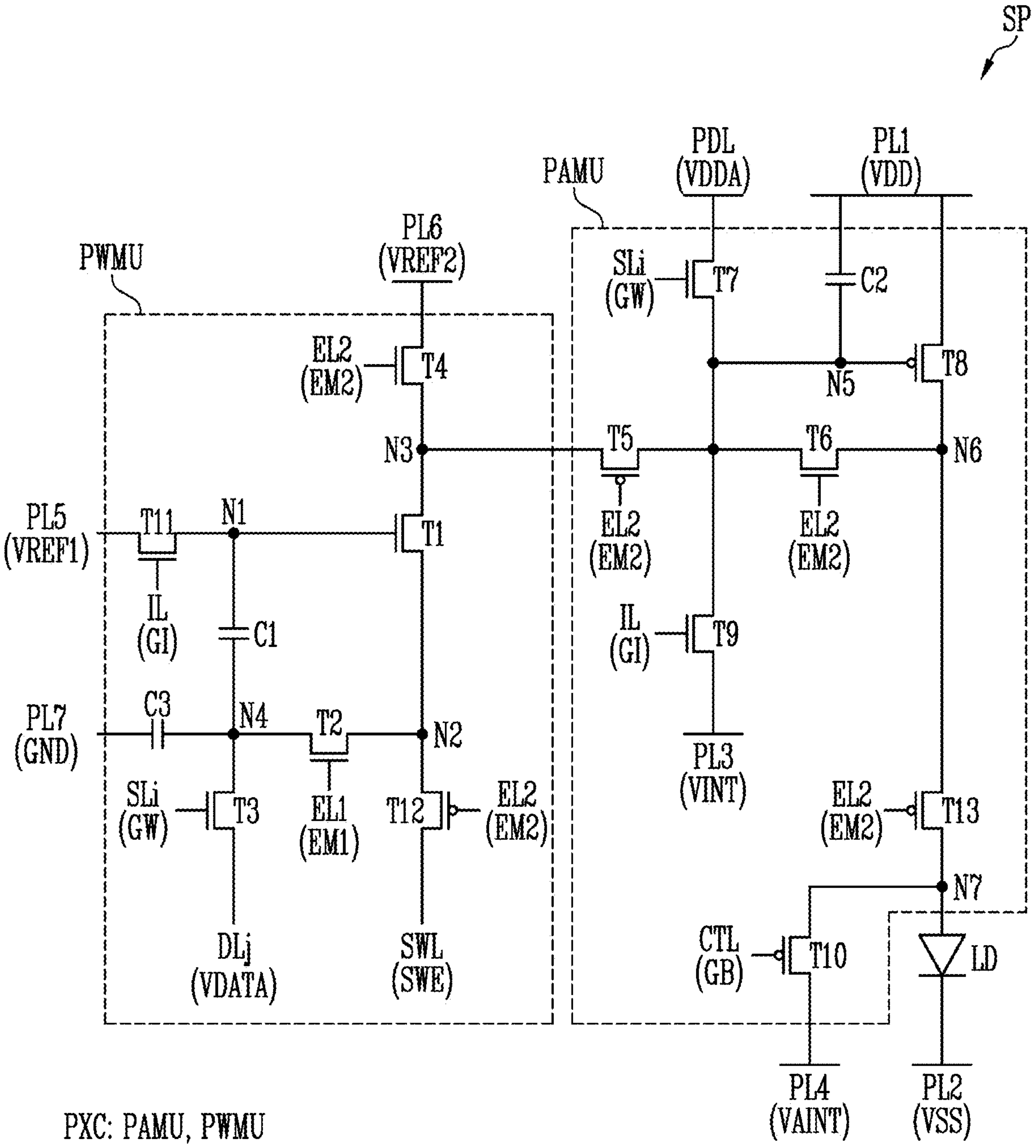
FIG. 2A is a drawing illustrating an embodiment of a sub-pixel included in the display device of FIG. 1.
Figure 2B:
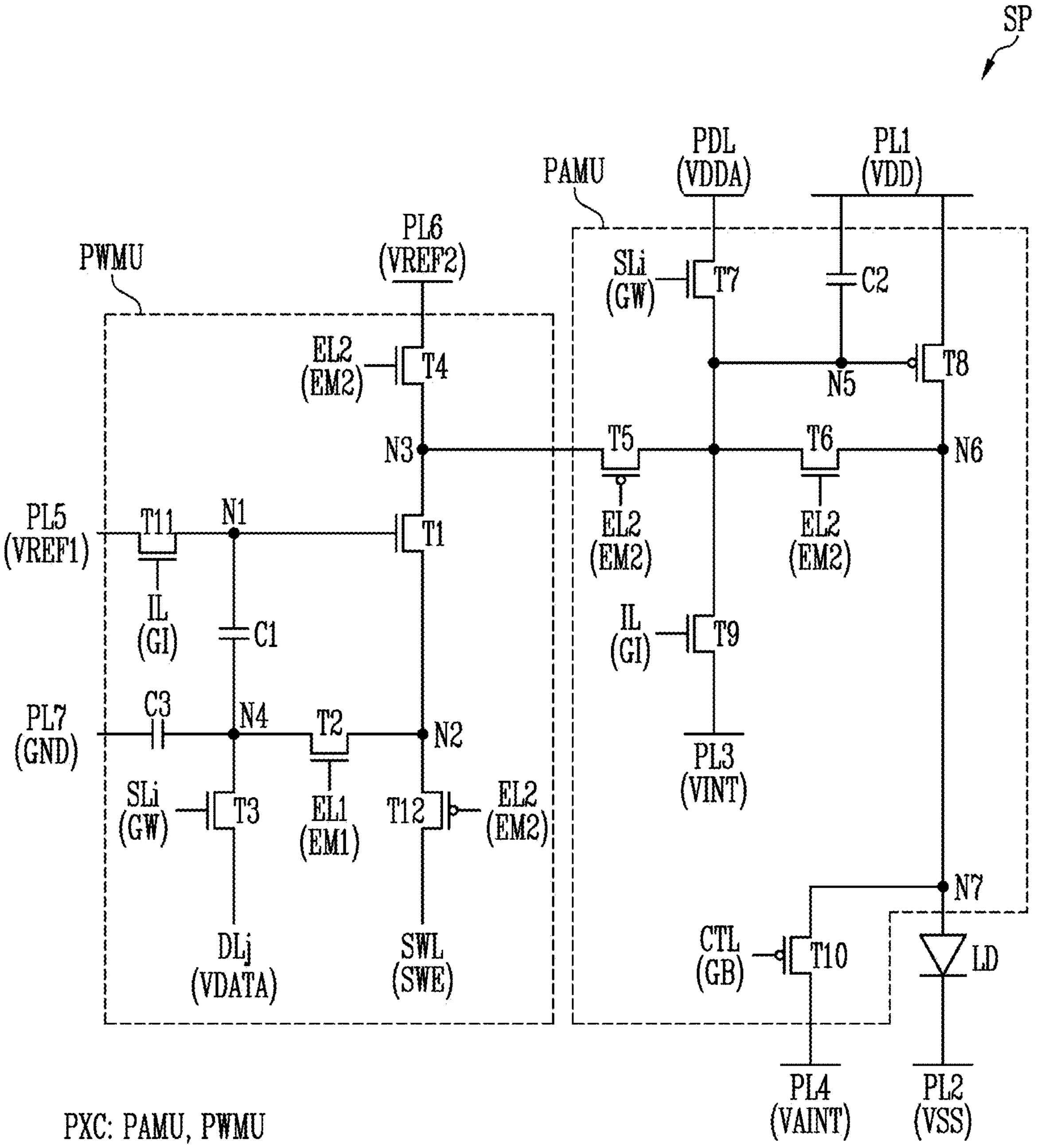
FIG. 2B is a drawing illustrating an embodiment of a sub-pixel included in the display device of FIG. 1.

FIGS. 2A and 2B are drawings illustrating an embodiment of the sub-pixel included in the display device of FIG. 1. In FIGS. 2A and 2B, the sub-pixel SP positioned on the i-th horizontal line and the j-th vertical line is shown.

Referring to FIGS. 2A and 2B, the sub-pixel SP may include a pixel circuit PXC and a light emitting element LD.

The light emitting element LD may be connected between a second circuit unit PAMU and the second power line PL2. For example, a first electrode (or an anode electrode) of the light emitting element LD may be connected to the second circuit unit PAMU (a seventh node N7, or a sixth node N6), and a second electrode (or a cathode electrode) may be connected to the second power line PL2. The light emitting element LD may emit light of a luminance correspondingly to a driving current supplied from the second circuit unit PAMU.

The light emitting element LD may be an inorganic light emitting element having an inorganic semiconductor. For example, the light emitting element LD may be a micro light emitting diode element of a flip chip type. In another embodiment, the light emitting element LD may be configured of an organic light emitting diode, a quantum dot light emitting diode, and the like. Although only one light emitting element LD is shown in FIG. 1, the disclosure is not limited thereto, and the light emitting element LD may be configured of multiple ultra-small light emitting elements. For example, the ultra-small light emitting elements may be connected in series, in parallel, or in series-parallel.

The pixel circuit PXC may include a first circuit unit PWMU and the second circuit unit PAMU.

The first circuit unit PWMU may control a supply period of the driving current supplied to the light emitting element LD based on a data signal VDATA (or a data voltage) received from the j-th data line DLj. The data signal may be a voltage corresponding to a grayscale to be expressed.

The first circuit unit PWMU may be a pulse width modulation (PWM) circuit unit. A light emission period of the sub-pixel SP may be decreased in case that the supply period of the driving current is decreased, and thus a luminance of the sub-pixel SP may decrease. The light emission period of the sub-pixel SP may be increased in case that the supply period of the driving current is increased, and thus the luminance of the sub-pixel SP may increase.

The second circuit unit PAMU may supply the driving current to the light emitting element LD. The second circuit unit PAMU may supply the driving current corresponding to a voltage difference of the pixel power VDDA supplied to the pixel power line PDL, for example, a difference between the first voltage level and the second voltage level, to the light emitting element LD. The second circuit unit PAMU may supply the driving current to the light emitting element LD during a time correspondingly to control of the first circuit unit PWMU.

The first circuit unit PWMU may include a first transistor T1, a second transistor T2, a third transistor T3, a fourth transistor T4, an eleventh transistor T11, a twelfth transistor T12, a first capacitor C1, and a third capacitor C3.

A first electrode of the first transistor T1 (or a first driving transistor) may be connected to a third node N3, and a second electrode may be connected to a second node N2. A gate electrode of the first transistor T1 may be connected to a first node N1. The first transistor T1 may control a current amount flowing between the third node N3 and the second node N2 correspondingly to a voltage of the first node N1.

A first electrode of the second transistor T2 may be connected to a fourth node N4, and a second electrode may be connected to the second node N2. A gate electrode of the second transistor T2 may be connected to the first emission control line EL1. The second transistor T2 may be turned on in case that the first emission control signal EM1 of a gate on voltage is supplied to the first emission control line EL1 to electrically connect the fourth node N4 and the second node N2.

A first electrode of the third transistor T3 may be connected to the fourth node N4, and a second electrode may be connected to the j-th data line DLj. A gate electrode of the second transistor T2 may be connected to the i-th scan line SLi. The third transistor T3 may be turned on in case that the scan signal GW of the gate on voltage is supplied to the i-th scan line SLi to electrically connect the j-th data line DLj and the fourth node N4.

A first electrode of the fourth transistor T4 may be connected to the sixth power line PL6, and a second electrode may be connected to the third node N3. A gate electrode of the fourth transistor T4 may be connected to the second emission control line EL2. The fourth transistor T4 may be turned on in case that the second emission control signal EM2 of a gate on voltage is supplied to the second emission control line EL2 to electrically connect the sixth power line PL6 and the third node N3.

A first electrode of the eleventh transistor T11 may be connected to the fifth power line PL5, and a second electrode may be connected to the first node N1. A gate electrode of the eleventh transistor T11 may be connected to the initialization line IL. The eleventh transistor T11 may be turned on in case that the initialization signal GI of the gate on voltage is supplied to the initialization line IL to electrically connect the fifth power line PL5 and the first node N1.

A first electrode of the twelfth transistor T12 may be connected to the second node N2, and a second electrode may be connected to the sweep line SWL. A gate electrode of the twelfth transistor T12 may be connected to the second emission control line EL2. The twelfth transistor T12 may be turned on in case that the second emission control signal EM2 of the gate on voltage is supplied to the second emission control line EL2 to electrically connect the second node N2 and the sweep line SWL.

A first electrode of the first capacitor C1 may be connected to the first node N1, and a second electrode may be connected to the fourth node N4. The first capacitor C1 may store the data signal VDATA provided to the fourth node N4.

A first electrode of the third capacitor C3 may be connected to the seventh power line PL7, and a second electrode may be connected to the fourth node N4. The seventh power line PL7 may be grounded, or a ground voltage GND may be applied to the seventh power line PL7. The third capacitor C3 may maintain a voltage of the fourth node N4.

The second circuit unit PAMU may include a fifth transistor T5, a sixth transistor T6, a seventh transistor T7, an eighth transistor T8, a ninth transistor T9, a tenth transistor T10, a thirteenth transistor T13, and a second capacitor C2.

A first electrode of the fifth transistor T5 may be connected to the third node N3, and a second electrode may be connected to the fifth node N5. A gate electrode of the fifth transistor T5 may be connected to the second emission control line EL2. The fifth transistor T5 may be turned on in case that the second emission control signal EM2 of the gate on voltage is supplied to the second emission control line EL2 to electrically connect the third node N3 and the fifth node N5.

A first electrode of the sixth transistor T6 may be connected to the fifth node N5, and a second electrode may be connected to the sixth node N6. A gate electrode of the sixth transistor T6 may be connected to the second emission control line EL2. The sixth transistor T6 may be turned on in case that the second emission control signal EM2 of the gate on voltage is supplied to the second emission control line EL2 to electrically connect the fifth node N5 and the sixth node N6.

A first electrode of the seventh transistor T7 may be connected to the pixel power line PDL, and a second electrode may be connected to the fifth node N5. A gate electrode of the seventh transistor T7 may be connected to the i-th scan line SLi. The seventh transistor T7 may be turned on in case that the scan signal GW of the gate on voltage is supplied to the i-th scan line SLi to electrically connect the pixel power line PDL and the fifth node N5.

A first electrode of the eighth transistor T8 (or a second driving transistor) may be connected to the first power line PL1, and a second electrode may be connected to the sixth node N6. A gate electrode of the eighth transistor T8 may be connected to the fifth node N5. The eighth transistor T8 may control the current amount of the driving current supplied to the light emitting element LD from the first power line PL1 to which the first power VDD is supplied correspondingly to a voltage of the fifth node N5. The driving current may be supplied from the first power line PL1 to the second power line PL2 to which the second power VSS is supplied via the eighth transistor T8, the thirteenth transistor T13, and the light emitting element LD. The second electrode of the light emitting element LD may be connected to the second power line PL2 to which the second power VSS is supplied, and the second power VSS may be set to a voltage lower than the first power VDD.

A first electrode of the ninth transistor T9 may be connected to the fifth node N5, and a second electrode may be connected to the third power line PL3. A gate electrode of the ninth transistor T9 may be connected to the initialization line IL. The ninth transistor T9 may be turned on in case that the initialization signal GI of the gate on voltage is supplied to the initialization line IL to electrically connect the third power line PL3 and the fifth node N5.

A first electrode of the tenth transistor T10 may be connected to the seventh node N7 (or the first electrode of the light emitting element LD), and a second electrode may be connected to the fourth power line PL4. A gate electrode of the tenth transistor T10 may be connected to the control line CTL. The tenth transistor T10 may be turned on in case that the control signal GB of the gate on voltage is supplied to the control line CTL to electrically connect the seventh node N7 and the fourth power line PL4.

A first electrode of the thirteenth transistor T13 may be connected to the sixth node N6, and a second electrode may be connected to the seventh node N7 (or the first electrode of the light emitting element LD). A gate electrode of the thirteenth transistor T13 may be connected to the second emission control line EL2. The thirteenth transistor T13 may be turned off in case that the second emission control signal EM2 of the gate on voltage is supplied to the second emission control line EL2 to electrically connect the sixth node N6 and the seventh node N7. According to an embodiment, as shown in FIG. 2B, the thirteenth transistor T13 may be omitted.

A voltage of the second initialization power VAINT may be supplied to the fourth power line PL4, and the voltage of the second initialization power VAINT may be set to discharge a parasitic capacitor (not shown) of the light emitting element LD. The voltage of the second initialization power VAINT may be set so that the light emitting element LD does not emit light. In case that the parasitic capacitor of the light emitting element LD is discharged, a black expression capability of the sub-pixel SP may be improved.

The second capacitor C2 may be connected between the first power line PL1 and the fifth node N5. The second capacitor C2 may store the pixel power VDDA provided to the fifth node N5.

In an embodiment, the fifth transistor T5, the eighth transistor T8, the tenth transistor T10, the twelfth transistor T12, and the thirteenth transistor T13 may be formed as polysilicon semiconductor transistors. For example, the fifth transistor T5, the eighth transistor T8, the tenth transistor T10, the twelfth transistor T12, and the thirteenth transistor T13 may include a polysilicon semiconductor layer formed through a low temperature poly-silicon (LTPS) process as an active layer (channel). The fifth transistor T5, the eighth transistor T8, the tenth transistor T10, the twelfth transistor T12, and the thirteenth transistor T13 may be P-type transistors (for example, PMOS). Accordingly, the gate on voltage that turns on the fifth transistor T5, the eighth transistor T8, the tenth transistor T10, the twelfth transistor T12, and the thirteenth transistor T13 may be a logic low level. Since the polysilicon semiconductor transistor has an advantage of fast response speed, the polysilicon semiconductor transistor may be applied to a switching element that requires fast switching.

In an embodiment, the first transistor T1, the second transistor T2, the third transistor T3, the fourth transistor T4, the sixth transistor T6, the seventh transistor T7, the ninth transistor T9, and the eleventh transistor T11 may be formed as oxide semiconductor transistors. For example, the first transistor T1, the second transistor T2, the third transistor T3, the fourth transistor T4, the sixth transistor T6, the seventh transistor T7, the ninth transistor T9, and the eleventh transistor T11 may be N-type oxide semiconductor transistors (for example, NMOS transistors) and may include an oxide semiconductor layer as an active layer. Accordingly, the gate on voltage that turns on the first transistor T1, the second transistor T2, the third transistor T3, the fourth transistor T4, the sixth transistor T6, the seventh transistor T7, the ninth transistor T9, and the eleventh transistor T11 may be a logic high level.

The oxide semiconductor transistor may be processed at a low temperature and has charge mobility lower than the polysilicon semiconductor transistor. For example, the oxide semiconductor transistor has an excellent off current characteristic. Therefore, a leakage current due to low-frequency driving may be minimized in case that the first transistor T1, the second transistor T2, the third transistor T3, the fourth transistor T4, the sixth transistor T6, the seventh transistor T7, the ninth transistor T9, and the eleventh transistor T11 are formed as oxide semiconductor transistors, and thus display quality may be improved.

Figure 3:
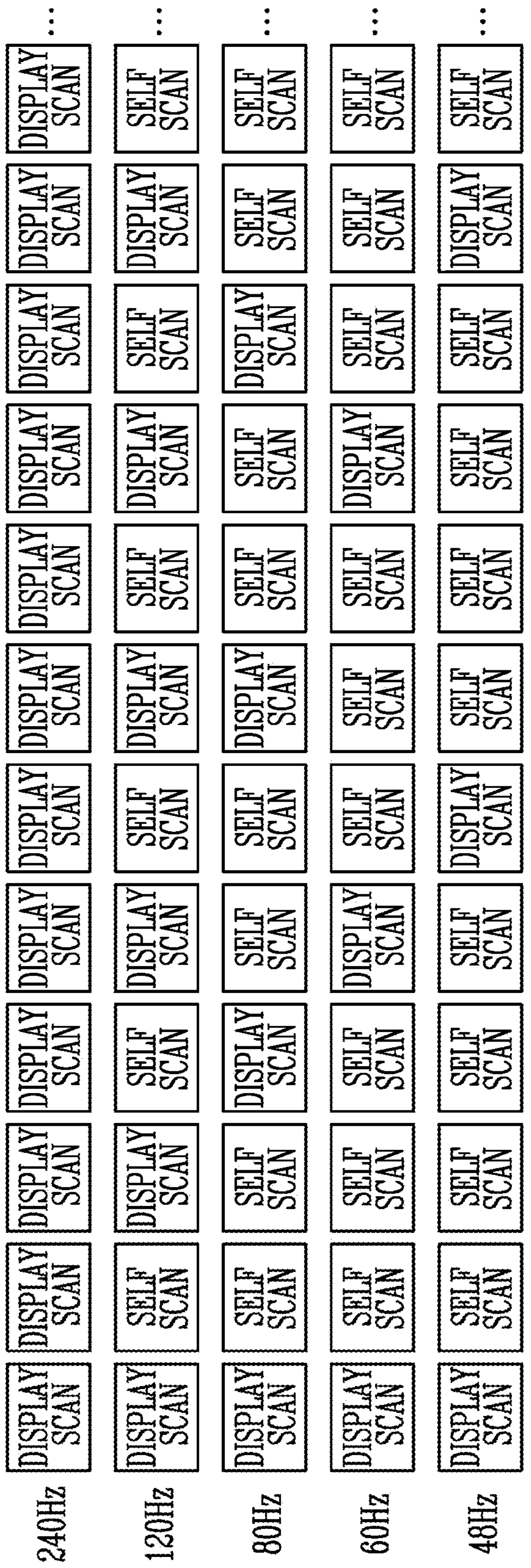
FIG. 3 is a schematic diagram illustrating an operation of the display device of FIG. 1.

FIG. 3 is a schematic diagram illustrating an operation of the display device of FIG. 1.

Referring to FIGS. 1 to 3, a display scan operation DISPLAY SCAN or a self scan operation SELF SCAN may be performed in one frame. A writing operation (and a light emitting operation) for writing the data signal VDATA to the sub-pixel SP of FIGS. 2A and 2B may be performed in case that the display scan operation DISPLAY SCAN is performed, and the light emitting operation may be performed without writing the data signal VDATA in case that the self scan operation SELF SCAN is performed.

At a maximum driving frequency (for example, in case that a driving frequency is 240 Hz) of the display device 100, the display scan operation DISPLAY SCAN of one frame may be continuously repeated, and the display scan operation DISPLAY SCAN of one frame may be set as one driving frame.

At driving frequencies (for example, 120 Hz, 80 Hz, 60 Hz, and 48 Hz) other than the maximum driving frequency of the display device 100, the display scan operation DISPLAY SCAN may be performed at one frame, and the self scan operation SELF SCAN may be performed at least at one frame.

For example, the display scan operation DISPLAY SCAN of one frame and the self scan operation SELF SCAN of one frame may be repeated, and the display scan operation DISPLAY SCAN of one frame and the self scan operation SELF SCAN of one frame may configure one driving frame in case that the driving frequency (or refresh rate) is 120 Hz. A same image may be displayed during one driving frame.

For example, the display scan operation DISPLAY SCAN of one frame and the self scan operation SELF SCAN of two frames may be repeated, and the display scan operation DISPLAY SCAN of one frame and the self scan operation SELF SCAN of two frames may configure one driving frame in case that the driving frequency is 80 Hz.

For example, the display scan operation DISPLAY SCAN of one frame and the self scan operation SELF SCAN of three frames may be repeated, and the display scan operation DISPLAY SCAN of one frame and the self scan operation SELF SCAN of three frames may configure one driving frame in case that the driving frequency is 60 Hz.

For example, the display scan operation DISPLAY SCAN of one frame and the self scan operation SELF SCAN of four frames may be repeated, and the display scan operation DISPLAY SCAN of one frame and the self scan operation SELF SCAN of four frames may configure one driving frame in case that the driving frequency is 48 Hz.

As described above, the display device 100 may vary the driving frequency in a method of adjusting a length of the self scan operation SELF SCAN.

Figure 4B:
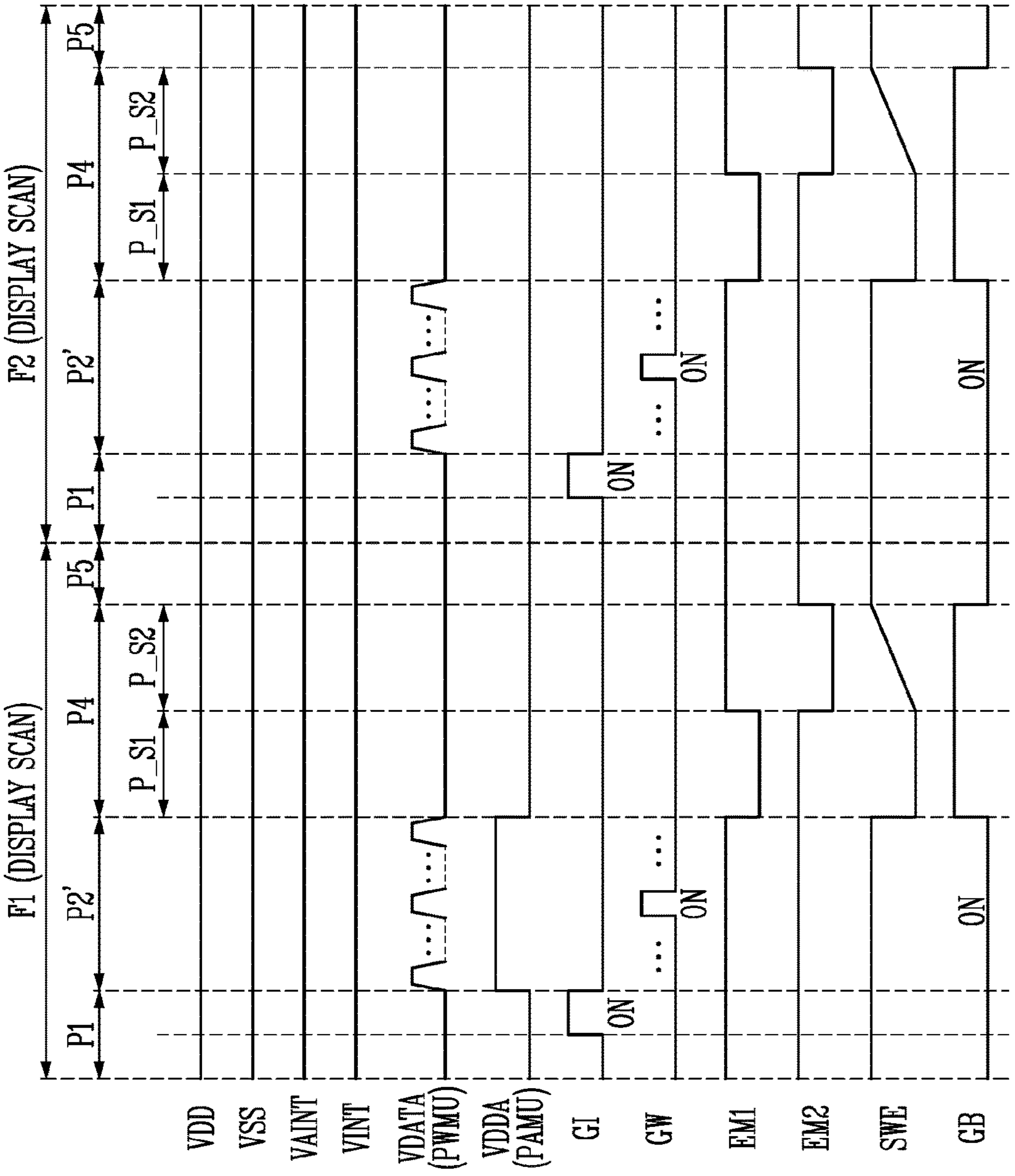
FIG. 4B is a waveform illustrating an embodiment of the operation of the display device shown in FIG. 1.

FIGS. 4A and 4B are waveforms illustrating an embodiment of the operation of the display device illustrated in FIG. 1. FIGS. 4A and 4B schematically show the operation of the display device 100 in a first case CASE1 in which the display device 100 of FIG. 1 is driven at the maximum driving frequency (for example, 240 Hz of FIG. 3). FIGS. 5A to 5E are schematic diagrams illustrating an operation of the sub-pixel of FIG. 2A according to an embodiment. FIGS. 5A to 5E schematically show the operation of the sub-pixel of FIG. 2A in each period of FIG. 4A.

Referring to FIGS. 1 to 4A, the display scan operation DISPLAY SCAN may be performed in a first frame period F1. The display scan operation DISPLAY SCAN may also be performed in a second frame period F2. The operation of the display device 100 in the second frame period F2 may be equal to the operation of the display device 100 in the first frame period F1.

The first frame period F1 may include a first period P1, a second period P2, a third period P3, a fourth period P4, and a fifth period P5.

The first period P1 may be a period in which the first transistor T1 (or the first capacitor C1) and the eighth transistor T8 (or the second capacitor C2) are initialized. The first period P1 may be referred to as an initialization period.

The second period P2 may be a period in which a voltage corresponding to the data signal VDATA and a threshold voltage of the first transistor T1 is stored in the first capacitor C1. The second period P2 may be referred to as a first data writing period.

The third period P3 may be a period in which a voltage corresponding to the pixel power VDDA and a threshold voltage of the eighth transistor T8 is stored in the second capacitor C2. The third period P3 may be referred to as a second data writing period.

The fourth period P4 may be a period in which the sub-pixel SP emits light during a time corresponding to the data signal VDATA. The fourth period P4 may be referred to as a light emission period.

The fifth period P5 may be a period in which light emission of the sub-pixel SP is ended and the sub-pixel SP does not emit light. The fifth period P5 may be referred to as a discharge period.

Since a gate on voltage varies according to a type of a transistor (for example, an N-type or a P-type), a state of a signal is described hereinafter as a logic low level (or a first level) or a logic high level (or a second level) instead of the term gate on voltage or gate-off voltage.

In the first period P1, the second period P2, the third period P3, and the fifth period P5, the first emission control signal EM1 of the logic high level may be provided to the first emission control line EL1, and the second transistor T2 may be turned on or may maintain a turn-on state. In the first period P1, the second period P2, the third period P3, and the fifth period P5, the second emission control signal EM2 of the logic high level may be provided to the second emission control line EL2, the fourth transistor T4 and the sixth transistor T6 may be turned on or may maintain a turn-on state, and the fifth transistor T5, the twelfth transistor T12, and the thirteenth transistor T13 may be turned off or may maintain a turn-off state. In the first period P1, the second period P2, the third period P3, and the fifth period P5, the control signal GB of the logic low level may be provided to the control line CTL, and the tenth transistor T10 may be turned on or may maintain a turn-on state. The voltage of the second initialization power VAINT may be supplied to the first electrode of the light emitting element LD, and the light emitting element LD may be set to a non-emission state in case that the tenth transistor T10 is turned on.

Figure 5A:
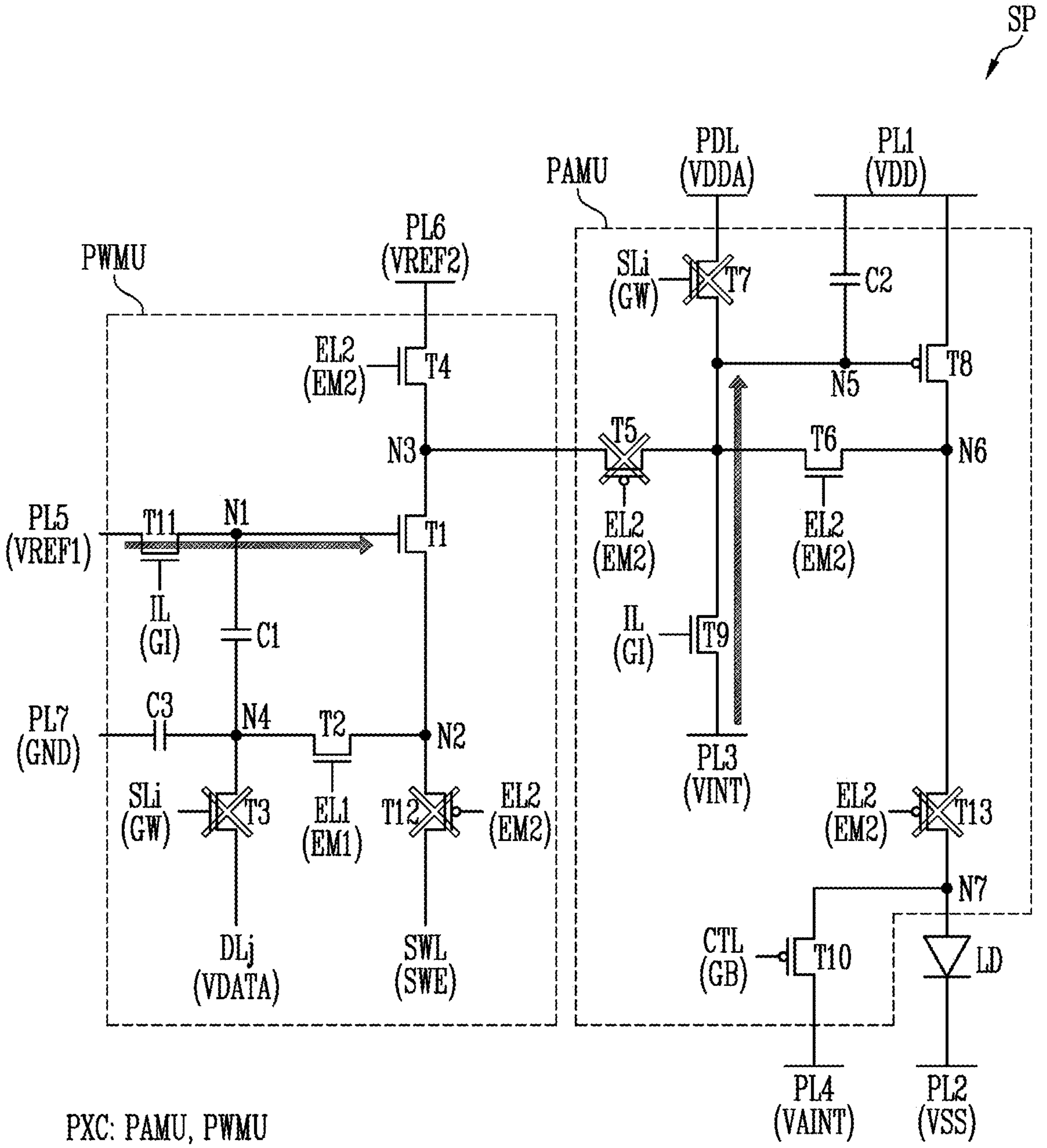
FIGS. 5A to 5E are schematic diagrams illustrating an operation of the sub-pixel of FIG. 2A according to an embodiment.

In the first period P1, the initialization signal GI of the logic high level may be supplied to the initialization line IL. Referring to FIG. 5A, in response to the initialization signal GI of the logic high level, the eleventh transistor T11 may be turned on, and the first reference power VREF1 of the fifth power line PL5 may be supplied to the first node N1. The first transistor T1 may be initialized by the first reference power VREF1. The first reference power VREF1 may have a voltage level at which the first transistor T1 may be turned on. Since the fourth transistor T4 and the second transistor T2 are turned on, the second reference power VREF2 of the sixth power line PL6 may be provided to the fourth node N4 through the fourth transistor T4, the first transistor T1, and the second transistor T2, and the first capacitor C1 may be initialized.

The nineth transistor T9 may be turned on in response to the initialization signal GI of the logic high level, and the initialization power VINT of the third power line PL3 may be supplied to the fifth node N5. The eighth transistor T8 (and the second capacitor C2) may be initialized by the initialization power VINT.

During the second period P2, the scan signal GW of the logic high level (or a gate on voltage ON) may be sequentially supplied to the scan lines SL (refer to FIG. 1). During the second period P2, the data signal VDATA may be supplied to the data line DL (refer to FIG. 1). The data signal may have a voltage for each sub-pixel SP correspondingly to the grayscale to be expressed.

Figure 5B:
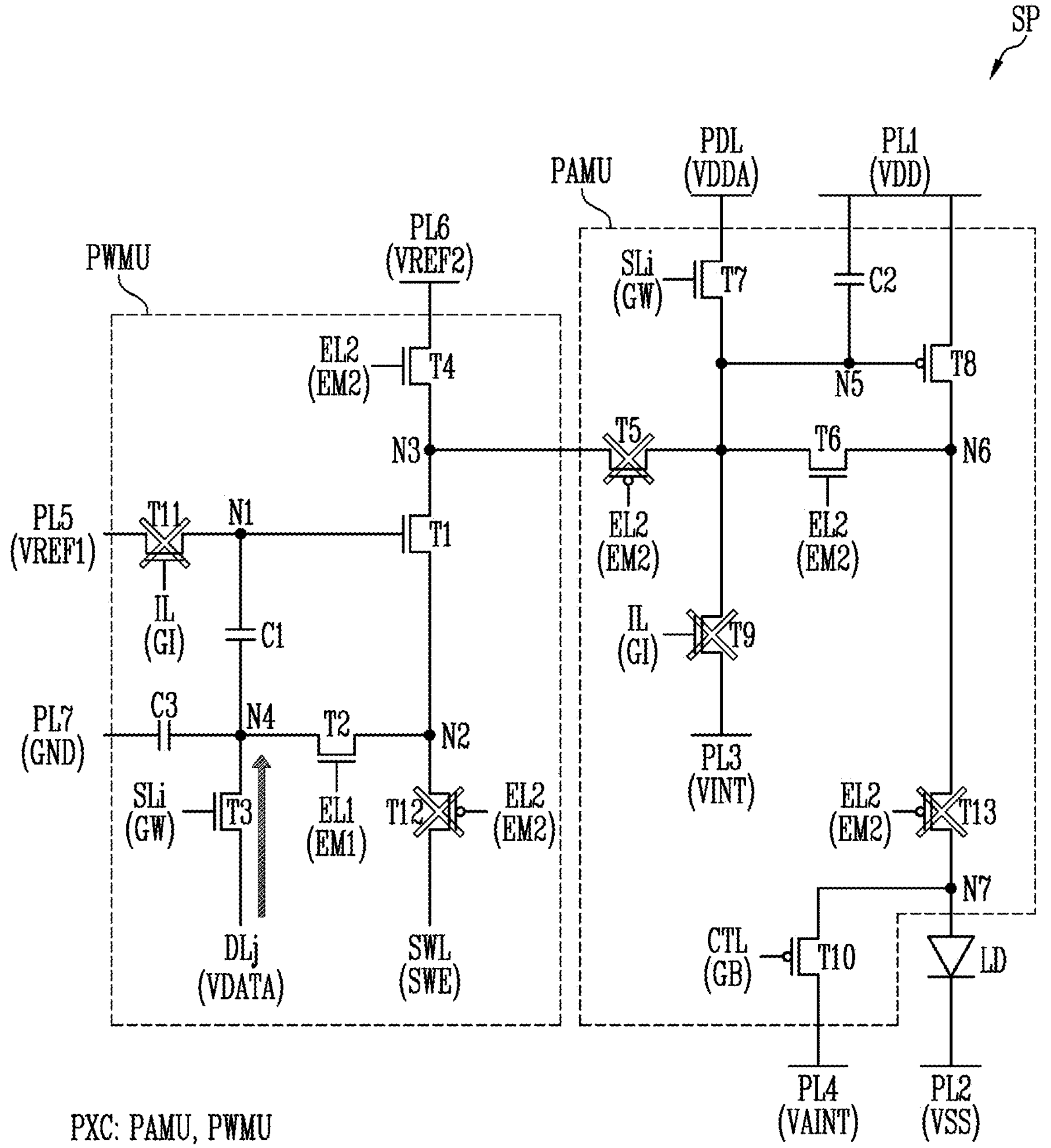

Referring to FIG. 5B, in case that the scan signal GW of the logic high level is supplied to the i-th scan line SLi, the third transistor T3 may be turned on, the j-th data line DLj and the fourth node N4 may be electrically connected, and the data signal VDATA may be supplied from the j-th data line DLj to the second node N2.

Since the second transistor T2 is turned on, the second node N2 and the fourth node N4 may be electrically connected, and the first capacitor C1 may be connected between the gate electrode and the second electrode (or source electrode) of the first transistor T1. The first transistor T1 may operate as a source follower by the first capacitor C1, and a voltage in which the threshold voltage of the first transistor T1 is reflected in the data signal VDATA may be stored in the first capacitor C1 (and the third capacitor C3). For example, the threshold voltage of the first transistor T1 may be compensated in a source follower method.

During the third period P3, the pixel power VDDA of the second voltage level may be supplied to the pixel power line PDL. The pixel power VDDA of the second voltage level may be set so that the driving current of the constant current may be supplied to the light emitting element LD while the eighth transistor T8 is driven in a saturation area.

Figure 5C:
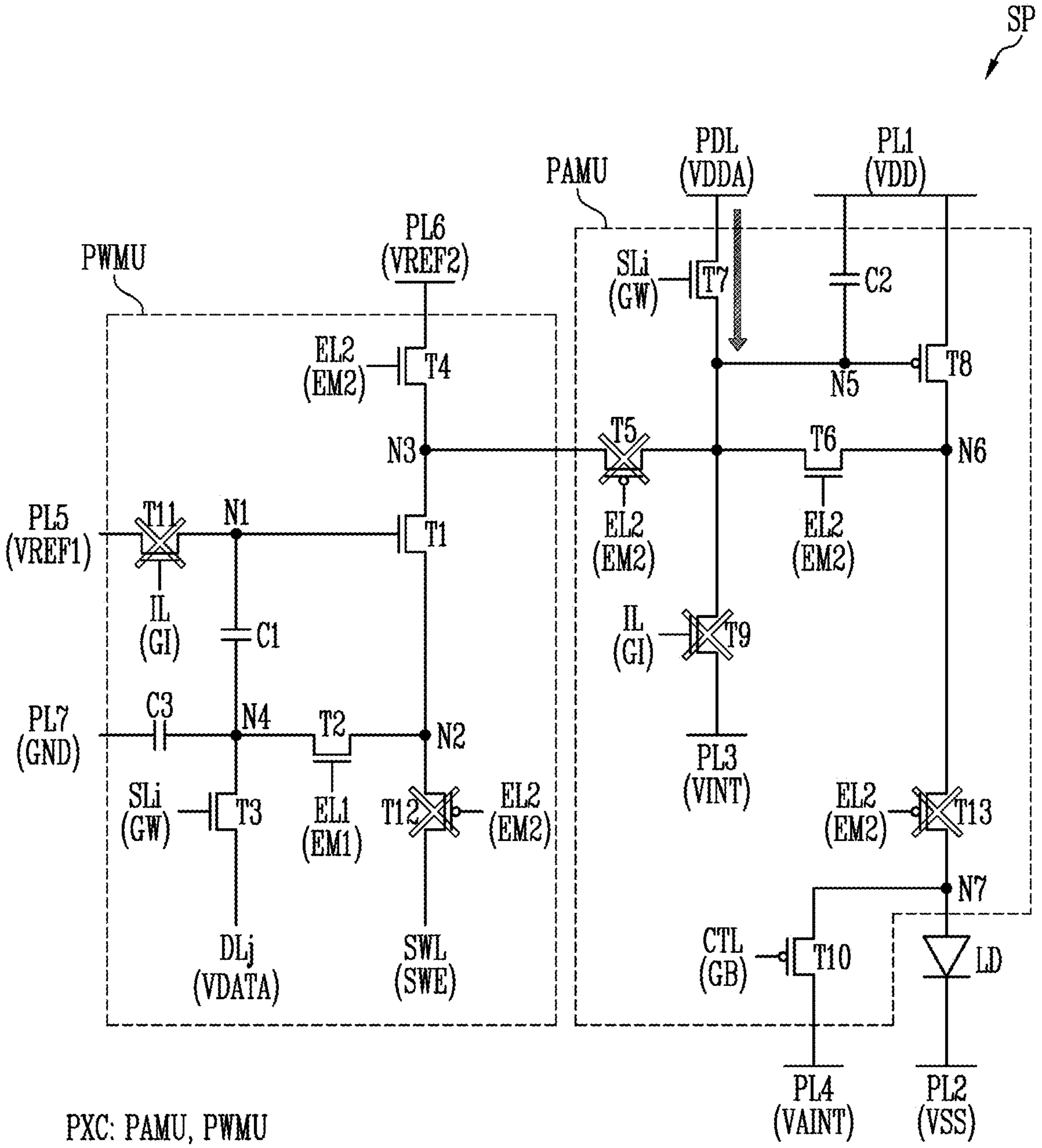

In the third period P3, the scan signal GW of the logic high level may be simultaneously supplied to the scan lines SL (refer to FIG. 1). Referring to FIG. 5C, the seventh transistor T7 may be turned on in response to the scan signal GW of the logic high level, and the pixel power VDDA of the second voltage level may be stored in the second capacitor C2. The eighth transistor T8 may be connected in a diode form by the turned-on sixth transistor T6, and a voltage in which the threshold voltage of the eighth transistor T8 is reflected in the pixel power VDDA may be stored in the second capacitor C2. For example, the threshold voltage of the eighth transistor T8 may be compensated in a diode connection method. For example, it has been described that the pixel power VDDA is written to the second capacitor C2 in the third period P3 with reference to FIG. 4A, but the disclosure is not limited thereto. For example, referring to FIG. 4B, the pixel power VDDA of the second voltage level may be supplied to the pixel power line PDL in a second period P2', and the pixel power VDDA may be written to the second capacitor C2 in the second period P2'.

Figure 5D:
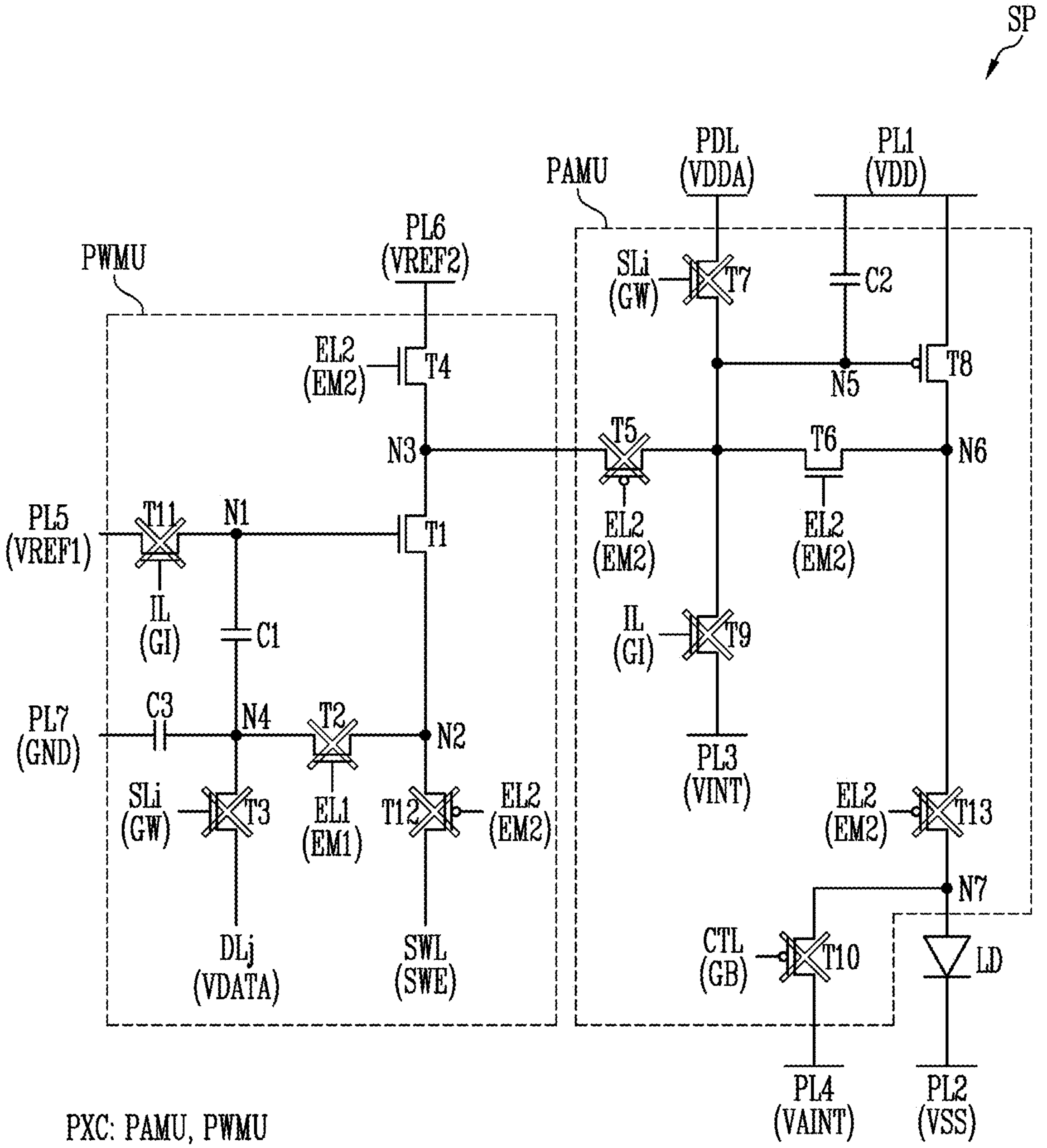
Figure 5E:
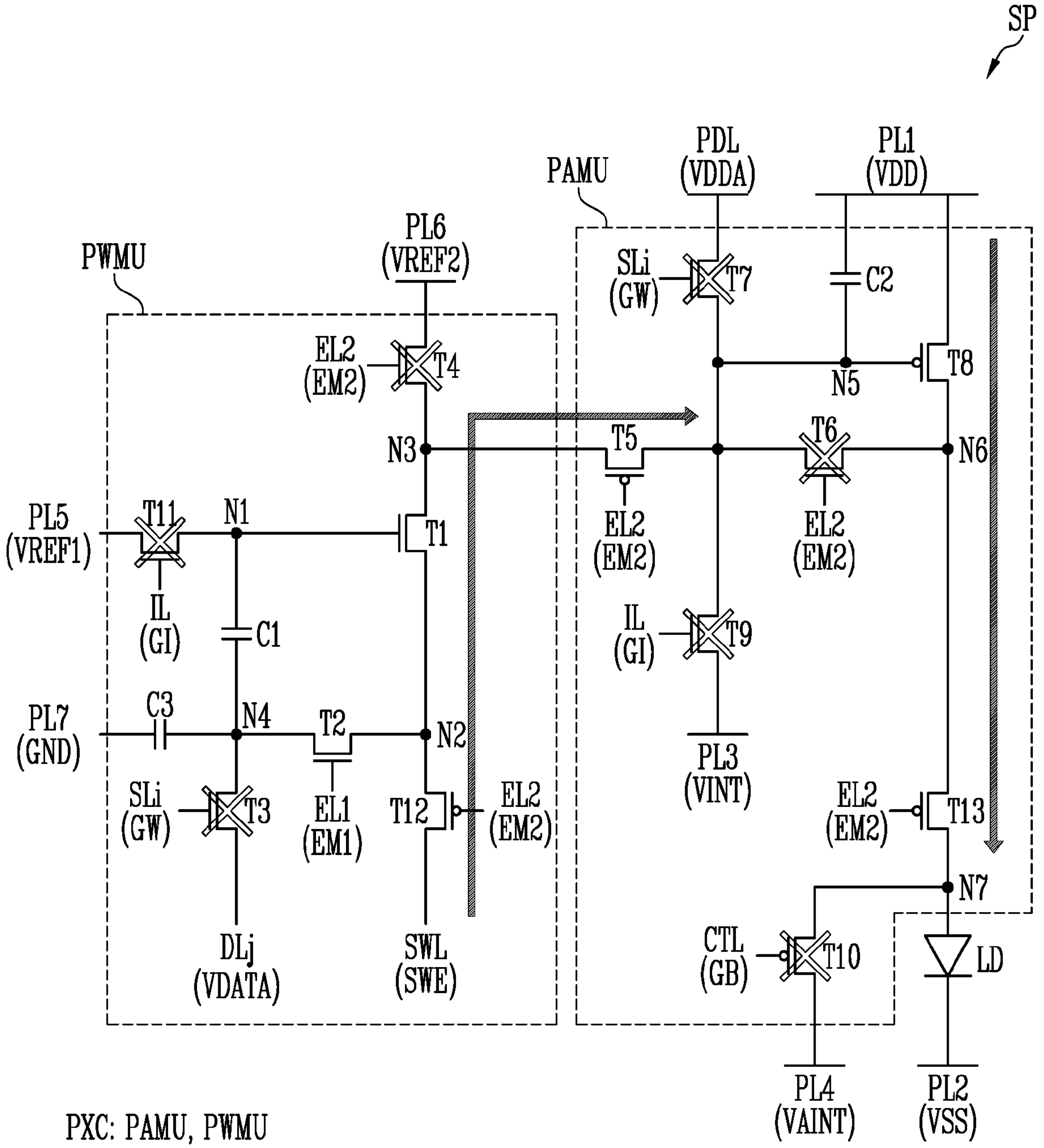

In the fourth period P4, the control signal GB of the logic high level may be supplied to the control line CTL. Referring to FIGS. 5D and 5E, the tenth transistor T10 may be turned off, and the light emitting element LD may be set to a state in which the light emitting element LD may emit light.

In the fourth period P4, the emission control signals EM1 and EM1 of the logic low level may be sequentially supplied to the first emission control line EL1 and the second emission control line EL2.

In the first sub-period P_S1 of the fourth period P4, the first emission control signal EM1 of the logic low level may be supplied to the first emission control line EL1. Referring to FIG. 5D, the second transistor T2 may be turned off. A current amount flowing through the first transistor T1 may be controlled according to the voltage of the first node N1, and a change rate of a voltage of the third node N3 may be determined according to the current amount.

In the first sub-period P_S1 of the fourth period P4, a sweep signal SWE of a third voltage level may be supplied, or the sweep signal SWE may be set to have the third voltage level. For example, the third voltage level may be a voltage level of a logic low level or a ground voltage GND.

In the second sub-period P_S2 of the fourth period P4, the second emission control signal EM2 of the logic low level may be supplied to the second emission control line EL2. Referring to FIG. 5E, in response to the second emission control signal EM2 of the logic low level, the twelfth transistor T12 and the thirteenth transistor T13 may be turned on, and the sixth transistor T6 may be turned off, and the driving current may flow from the first power line PL1 to the second power line PL2 through the eighth transistor T8, the thirteenth transistor T13, and the light emitting element LD. The driving current may correspond to a voltage of the fifth node N5 (for example, the pixel power VDDA), and the light emitting element LD may emit light with a luminance corresponding to the driving current.

The fifth transistor T5 may be turned on and the fourth transistor T4 may be turned off in response to the second emission control signal EM2 of the logic low level. The fifth transistor T5 may connect the first circuit unit PWMU to the fifth node N5.

In the second sub-period P_S2 of the fourth period P4, a voltage level of the sweep signal SWE may gradually change or increase from the third voltage level to the fourth voltage level. A voltage level of the third node N3 and the fifth node N5 may change correspondingly to a change of a voltage (for example, the data signal VDATA) stored in the first capacitor C1 and the voltage level of the sweep signal SWE. The eighth transistor T8 may be turned off in case that the voltage level of the fifth node N5 increases to the logic high level. In other words, the eighth transistor T8 may be turned on and the light emitting element LD may emit light before the voltage level of the fifth node N5 increases to the logic high level.

A time point when the eighth transistor T8 is turned off may be determined or changed according to the data signal VDATA supplied in the second period P2. For example, the higher the voltage level of the data signal VDATA supplied in the second period P2, the faster the voltage level of the third node N3 increases, and the earlier a time point when the eighth transistor T8 is turned off may be. For example, the lower the voltage level of the data signal VDATA supplied in the second period P2, the slower the voltage level of the third node N3 increases, and the time point when the eighth transistor T8 is turned off may be later.

A current path may be blocked in case that the eighth transistor T8 is turned off. Accordingly, the supply of the driving current to the light emitting element LD may be stopped, and the light emitting element LD may be set to the non-emission state. The earlier a time point when the driving current is stopped, the lower a luminance of the sub-pixel SP recognized in a corresponding frame period may be. The later the time point when the driving current is stopped, the higher the luminance of the sub-pixel SP recognized in the corresponding frame period may be.

In the fifth period P5, the control signal GB of the logic low level may be provided to the control line CTL, and the second emission control signal EM2 of the logic high level may be provided. The tenth transistor T10 may be turned on in response to the control signal GB of the logic low level, the fifth transistor T5, the twelfth transistor T12, and the thirteenth transistor T13 may be turned off in response to the second emission control signal EM2 of the logic high level, and the light emitting element LD may not emit light.

As described above, the sub-pixel SP may implement a grayscale using the light emission time. The light emitting element may be driven using a constant current (for example, driving current) in case that the grayscale is implemented using the light emission time, and thus display quality may be improved.

For example, a wavelength may shift correspondingly to a current density in case that an amount of the driving current is controlled correspondingly to the voltage of the data signal, and thus display quality may be reduced. In particular, a wavelength shift characteristic for each current density may become large in case that the light emitting element LD is applied as a micro LED to be applied to a high-resolution panel, and thus a desired image may not be displayed.

Figure 6:
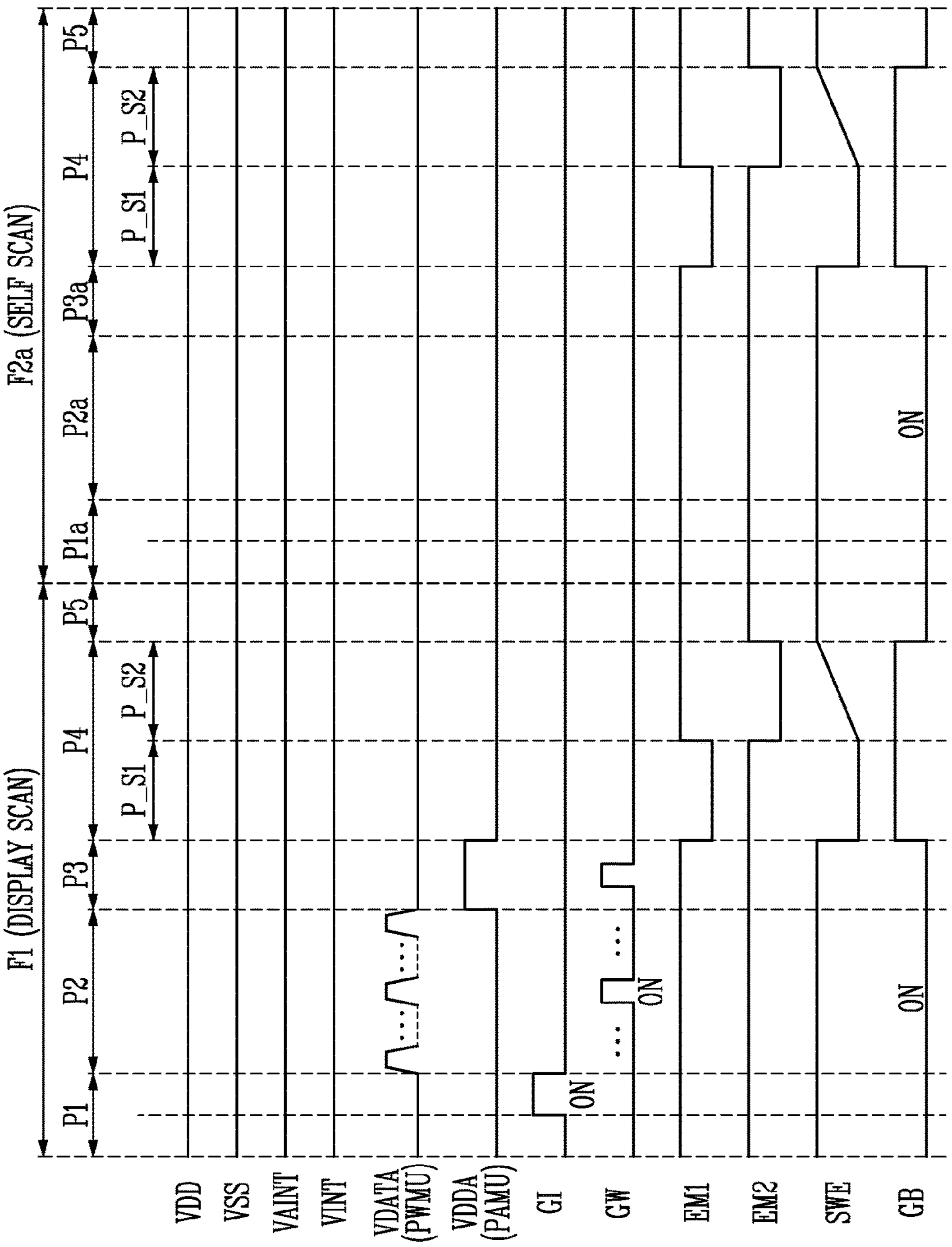
FIG. 6 is a waveform illustrating an embodiment of the operation of the display device shown in FIG. 1.

FIG. 6 is a waveform illustrating an embodiment of the operation of the display device shown in FIG. 1. FIG. 6 shows the operation of the display device 100 in a second case CASE2 in which the display device 100 of FIG. 1 is driven at a driving frequency (for example, 120 Hz, 80 Hz, 60 Hz, and 48 Hz) other than the maximum driving frequency.

Referring to FIGS. 1 to 6, the display scan operation DISPLAY SCAN may be performed in the first frame period F1. The self scan operation SELF SCAN may be performed in a second frame period F2*a*. The lower the driving frequency, the more the number of self scan operations SELF SCAN included in one driving frame may be.

The second frame period F2*a* may include a first period Pla, a second period P2*a*, a third period P3*a*, a fourth period P4, and a fifth period P5.

Differently from the first period P1 of the first frame period F1, in the first period Pla of the second frame period F2*a*, only the initialization signal GI of the logic low level may be supplied to the initialization line IL. Therefore, the first transistor T1 (and the first capacitor C1) and the eighth transistor T8 (and the second capacitor C2) may not be initialized and may maintain states in the first frame period F1, respectively.

Differently from the second period P2 of the first frame period F1, in the second period P2*a* of the second frame period F2*a*, the scan signal GW of the logic low level may be supplied to the scan lines SL (refer to FIG. 1). In the second period P2*a* of the second frame period F2*a*, the data signal VDATA may not be supplied. Therefore, the writing operation of the data signal VDATA may not be performed in the second period P2*a* of the second frame period F2*a*.

Differently from the third period P3 of the first frame period F1, in the third period P3*a* of the second frame period F2*a*, the initialization signal GI of the logic low level may be supplied to the initialization line IL. Therefore, the writing operation of the pixel power VDDA may not be performed in the third period P3*a* of the second frame period F2*a*.

Similarly to the fourth period P4 of the first frame period F1, in the fourth period P4 of the second frame period F2*a*, the sub-pixel SP may emit light during a time corresponding to the data signal VDATA.

Equally to the fifth period P5 of the first frame period F1, in the fifth period P5 of the second frame period F2*a*, light emission of the sub-pixel SP is ended, and the sub-pixel SP may not emit light.

The lower the driving frequency, the more the number of self scan operations SELF SCAN included in one driving frame may increase. Since a substantial operation does not exist in the first period Pla, the second period P2*a*, and the third period P3*a* in the self scan operation SELF SCAN, the lower the driving frequency (or refresh rate), the more the number of times the fourth period P4 (and the fifth period P5) included in one driving frame is discontinuously repeated may be.

A display device according to an embodiment may be applicable to various types of electronic devices. In an embodiment, an electronic device may include the above-described display device and may further include other modules or devices having additional functions in addition to the display device.

Figure 7:
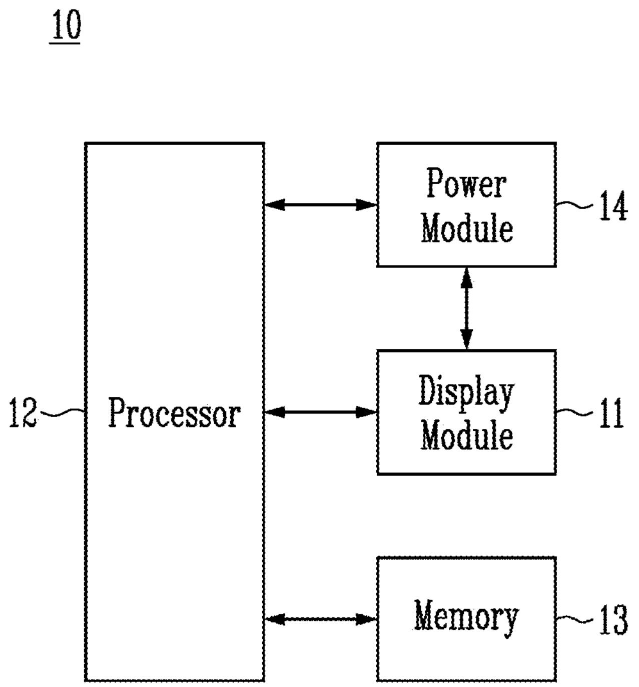
FIG. 7 is a schematic block diagram of an electronic device according to an embodiment.

FIG. 7 is a schematic block diagram of an electronic device according to an embodiment. Referring to FIG. 7, the electronic device 10 may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), and a controller.

The memory 13 may store data and/or information used to operate the processor 12 or the display module 11. In case that the processor 12 executes an application stored in the memory 13, image data signals and/or input control signals may be transferred to the display module 11. The display module 11 may process the provided signals and output image information on a display screen.

The power module 14 may include a power supply module, such as a power adapter or a battery device, and a power conversion module. The power conversion module may convert power supplied by the power supply module and generate power to operate the electronic device 10.

At least one of the above-described components of the electronic device 10 may be included in the display device according to embodiments as described above. In terms of functionality, some of the individual modules included in one module may be included in the display device and others may be provided separately from the display device. For example, the display module 11 may be included in the display device, whereas the processor 12, the memory 13, and the power module 14 may be not included in the display device and may be instead provided separately in the electronic device 10.

Figure 8:
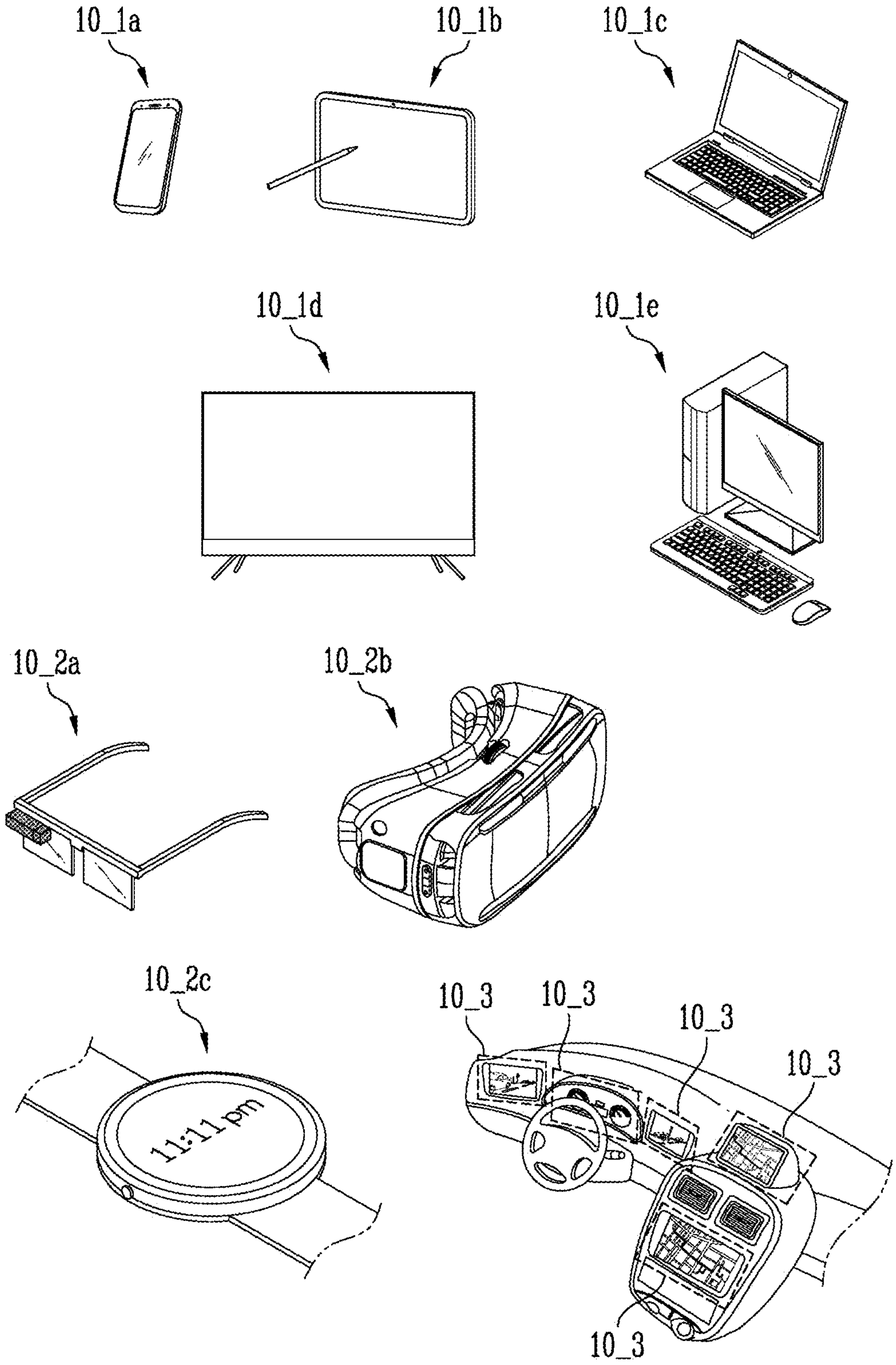
FIG. 8 shows schematic views of various embodiments of an electronic device.

FIG. 8 shows schematic views of various embodiments of an electronic device.

Referring to FIG. 8, various types of electronic devices to which embodiments of a display device are applied may include an electronic device to display images such as a smartphone 10_1*a*, a tablet PC 10_1*b*, a laptop computer 10_1*c*, a television (TV) 10_1*d*, and a desktop monitor 10_1*e*, a wearable electronic device including a display module such as smart glasses 10_2*a*, a head-mounted display (HMD) 10_2*b*, and a smart watch 10_2*c*, and an automotive electronic device 10_3 including a display module such as a center information display (CID) disposed at the instrument cluster, the center fascia, and the dashboard of a vehicle, and a room mirror display.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A pixel comprising:

a first transistor having a first electrode connected to a third node, a second electrode connected to a second node, and a gate electrode connected to a first node;

a second transistor having a first electrode connected to a fourth node, a second electrode connected to the second node, and a gate electrode connected to a first emission control line;

a third transistor having a first electrode connected to the fourth node, a second electrode connected to a data line, and a gate electrode connected to a scan line;

a fourth transistor having a first electrode connected to a sixth power line, a second electrode connected to the third node, and a gate electrode connected to a second emission control line;

a fifth transistor having a first electrode connected to the third node, a second electrode connected to a fifth node, and a gate electrode connected to the second emission control line;

a sixth transistor having a first electrode connected to the fifth node, a second electrode connected to a sixth node, and a gate electrode connected to the second emission control line;

a seventh transistor having a first electrode connected to a pixel power line, a second electrode connected to the fifth node, and a gate electrode connected to the scan line;

an eighth transistor having a first electrode connected to a first power line, a second electrode connected to the sixth node, and a gate electrode connected to the fifth node;

a twelfth transistor having a first electrode connected to the second node, a second electrode connected to a sweep line, and a gate electrode connected to the second emission control line;

a first capacitor connected between the first node and the fourth node;

a second capacitor connected between the first power line and the fifth node;

a third capacitor connected between the fourth node and a seventh power line; and a light emitting element connected between the sixth node and a second power line.

2. The pixel according to claim 1, wherein each of the first to fourth transistors, the sixth transistor, and the seventh transistor includes an oxide semiconductor layer, and each of the fifth transistor and the eighth transistor includes a silicon semiconductor layer.

3. The pixel according to claim 1, further comprising:

a ninth transistor having a first electrode connected to the fifth node, a second electrode connected to a third power line, and a gate electrode connected to an initialization line.

4. The pixel according to claim 3, further comprising:

a tenth transistor having a first electrode connected to a first electrode of the light emitting element, a second electrode connected to a fourth power line, and a gate electrode connected to a control line.

5. The pixel according to claim 4, further comprising:

an eleventh transistor having a first electrode connected to a fifth power line, a second electrode connected to the first node, and a gate electrode connected to the initialization line.

6. The pixel according to claim 5, further comprising:

a thirteenth transistor having a first electrode connected to the sixth node, a second electrode connected to the first electrode of the light emitting element, and a gate electrode connected to the second emission control line.

7. A display device comprising:

a pixel disposed on a substrate, wherein the pixel comprises:

a first transistor having a first electrode connected to a third node, a second electrode connected to a second node, and a gate electrode connected to a first node;

a second transistor having a first electrode connected to a fourth node, a second electrode connected to the second node, and a gate electrode connected to a first emission control line;

a third transistor having a first electrode connected to the fourth node, a second electrode connected to a data line, and a gate electrode connected to a scan line;

a fourth transistor having a first electrode connected to a sixth power line, a second electrode connected to the third node, and a gate electrode connected to a second emission control line;

a fifth transistor having a first electrode connected to the third node, a second electrode connected to a fifth node, and a gate electrode connected to the second emission control line;

a sixth transistor having a first electrode connected to the fifth node, a second electrode connected to a sixth node, and a gate electrode connected to the second emission control line;

a seventh transistor having a first electrode connected to a pixel power line, a second electrode connected to the fifth node, and a gate electrode connected to the scan line;

an eighth transistor having a first electrode connected to a first power line, a second electrode connected to the sixth node, and a gate electrode connected to the fifth node;

a twelfth transistor having a first electrode connected to the second node, a second electrode connected to a sweep line, and a gate electrode connected to the second emission control line;

a first capacitor connected between the first node and the fourth node;

a second capacitor connected between the first power line and the fifth node;

a third capacitor connected between the fourth node and a seventh power line; and a light emitting element connected between the sixth node and a second power line.

8. The display device according to claim 7, wherein each of the first to fourth transistors, the sixth transistor, and the seventh transistor includes an oxide semiconductor layer, and each of the fifth transistor and the eighth transistor includes a silicon semiconductor layer.

9. The display device according to claim 7, wherein the pixel further comprises a ninth transistor having a first electrode connected to the fifth node, a second electrode connected to a third power line, and a gate electrode connected to an initialization line.

10. The display device according to claim 9, wherein the pixel further comprises a tenth transistor having a first electrode connected to a first electrode of the light emitting element, a second electrode connected to a fourth power line, and a gate electrode connected to a control line.

11. The display device according to claim 10, wherein the pixel further comprises an eleventh transistor having a first electrode connected to a fifth power line, a second electrode connected to the first node, and a gate electrode connected to the initialization line.

12. The display device according to claim 11, wherein the pixel further comprises a thirteenth transistor having a first electrode connected to the sixth node, a second electrode connected to the first electrode of the light emitting element, and a gate electrode connected to the second emission control line.

13. The display device according to claim 11, further comprising:

a data driver connected to the data line;

a scan driver connected to the scan line;

a sweep driver connected to the sweep line; and a common driver connected to the initialization line, the first emission control line, the second emission control line, the control line, and the pixel power line.

14. The display device according to claim 13, wherein in a first period of a driving frame period, the common driver supplies an initialization signal.

15. The display device according to claim 14, wherein in a second period of the driving frame period, the scan driver supplies a scan signal to the scan line, and the data driver supplies a data signal to the data line.

16. The display device according to claim 15, wherein in a third period of the driving frame period, the common driver supplies the scan signal to the scan line, and changes pixel power supplied to the pixel power line from a first voltage level to a second voltage level.

17. The display device according to claim 16, wherein in a fourth period of the driving frame period, the common driver changes a control signal supplied to the control line from a first level to a second level, and sequentially supplies an emission control signal of a first level to the first emission control line and the second emission control line, and as a refresh rate decreases, a number of times the fourth period is discontinuously repeated in the driving frame period increases.

18. An electronic device comprising:

a processor that provides image data; and a display device that displays an image based on the image data, wherein the display device comprises a pixel, and the pixel comprises:

a first transistor having a first electrode connected to a third node, a second electrode connected to a second node, and a gate electrode connected to a first node;

a second transistor having a first electrode connected to a fourth node, a second electrode connected to the second node, and a gate electrode connected to a first emission control line;

a third transistor having a first electrode connected to the fourth node, a second electrode connected to a data line, and a gate electrode connected to a scan line;

a fourth transistor having a first electrode connected to a sixth power line, a second electrode connected to the third node, and a gate electrode connected to a second emission control line;

a fifth transistor having a first electrode connected to the third node, a second electrode connected to a fifth node, and a gate electrode connected to the second emission control line;

a sixth transistor having a first electrode connected to the fifth node, a second electrode connected to a sixth node, and a gate electrode connected to the second emission control line;

a seventh transistor having a first electrode connected to a pixel power line, a second electrode connected to the fifth node, and a gate electrode connected to the scan line;

an eighth transistor having a first electrode connected to a first power line, a second electrode connected to the sixth node, and a gate electrode connected to the fifth node;

a twelfth transistor having a first electrode connected to the second node, a second electrode connected to a sweep line, and a gate electrode connected to the second emission control line;

a first capacitor connected between the first node and the fourth node;

a second capacitor connected between the first power line and the fifth node;

a third capacitor connected between the fourth node and a seventh power line; and a light emitting element connected between the sixth node and a second power line.

* * * * *